Figure 1:
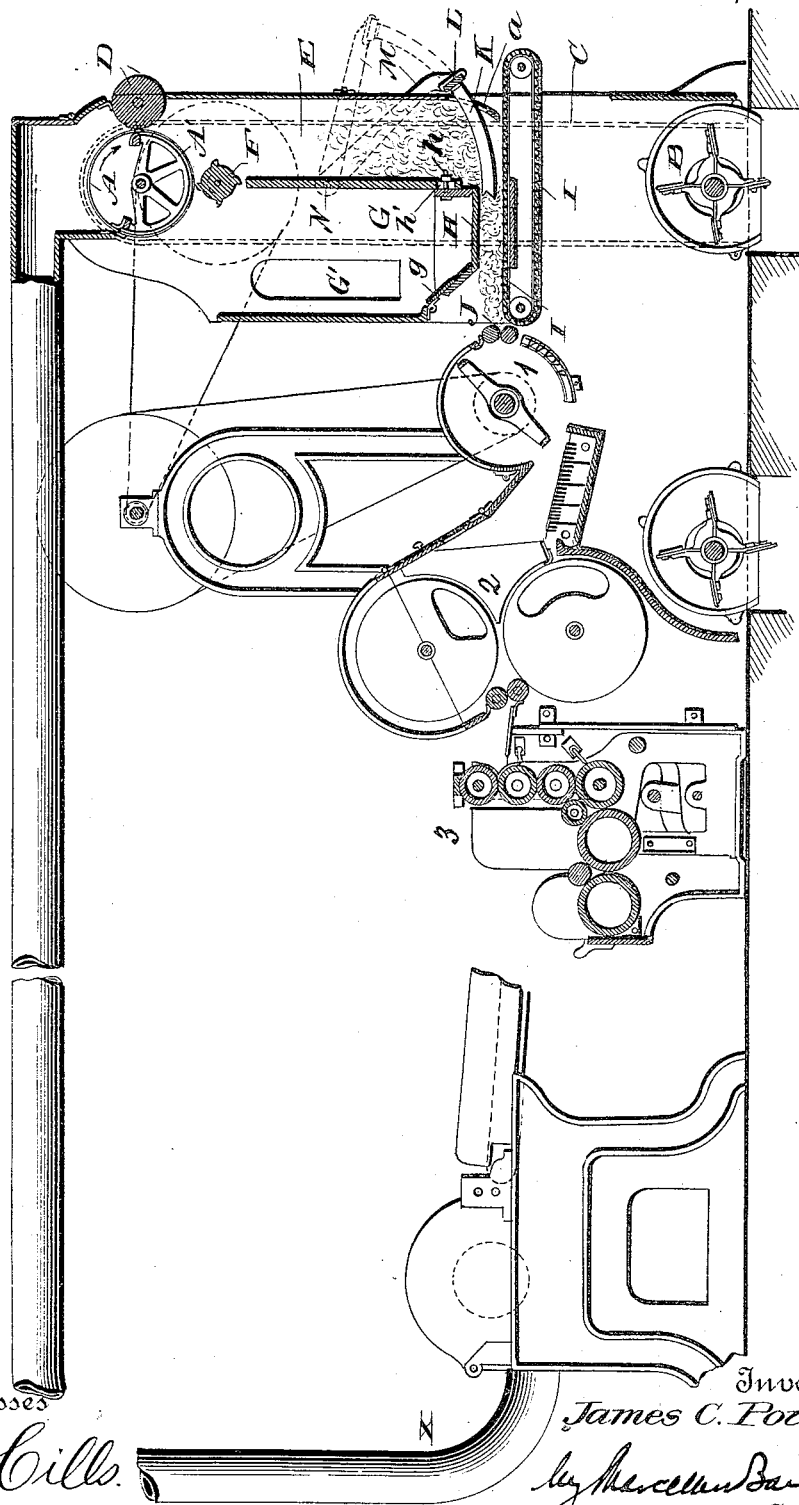

(No Model.) J. C. POTTER. 3 Sheets—Sheet 1.
FEED REGULATING DEVICE FOR MACHINES FOR OPENING AND PREPARING COTTON.

No. 529,567. Patented Nov. 20, 1894.

Witnesses
L. C. Hills
[signature]

Inventor:
James C. Potter
by McClellan Bailey
Attorney

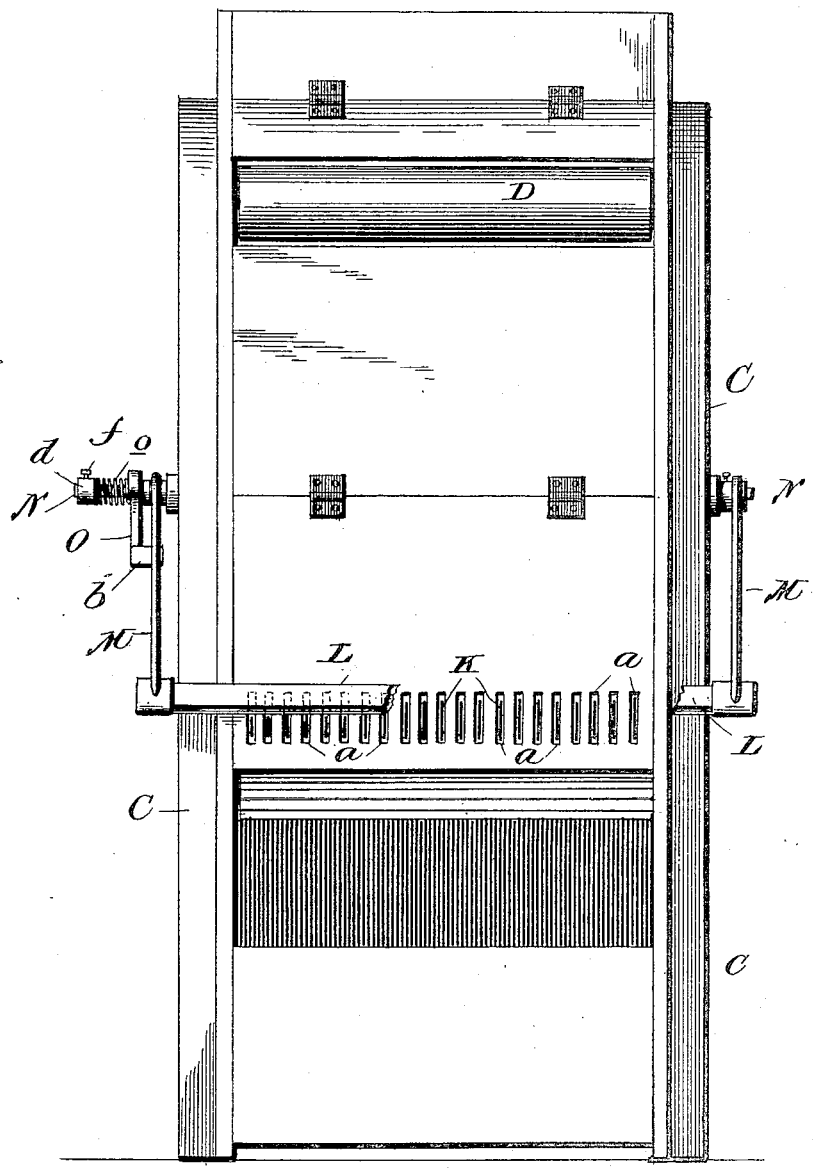

(No Model.) J. C. POTTER. 3 Sheets—Sheet 3.
FEED REGULATING DEVICE FOR MACHINES FOR OPENING AND PREPARING COTTON.
No. 529,567. Patented Nov. 20, 1894.
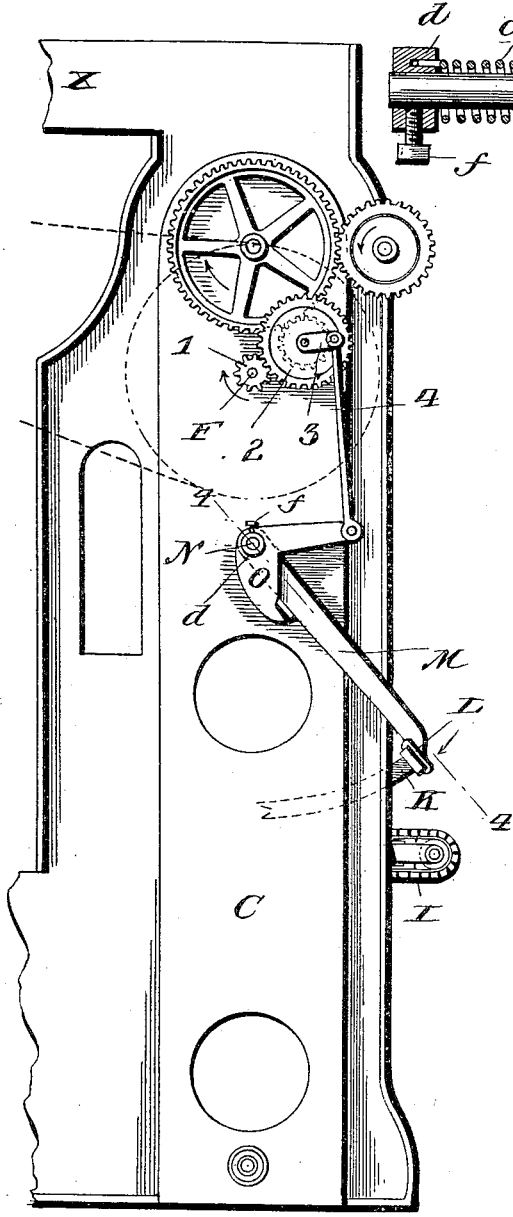
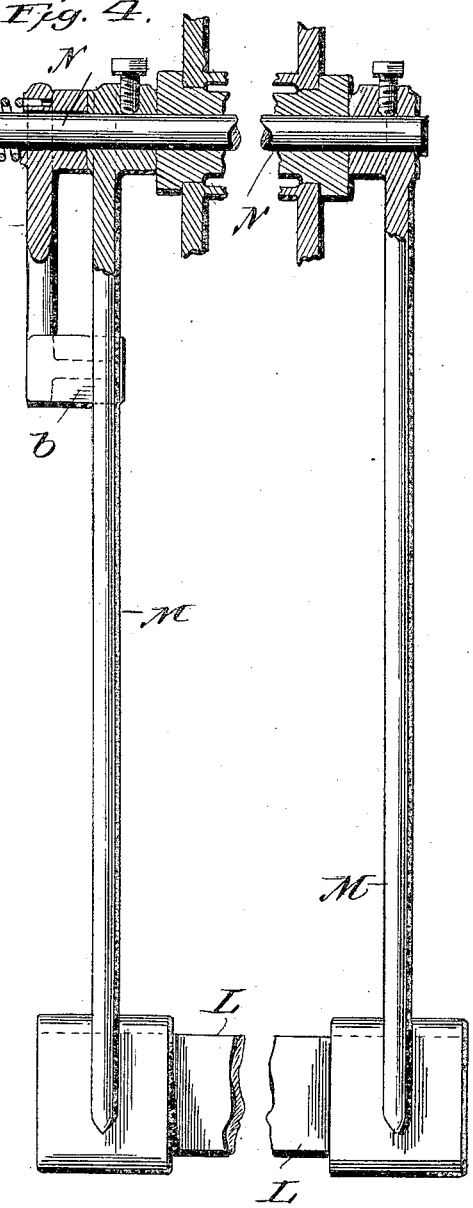

UNITED STATES PATENT OFFICE.

JAMES C. POTTER, OF PAWTUCKET, RHODE ISLAND.

FEED-REGULATING DEVICE FOR MACHINES FOR OPENING AND PREPARING COTTON.

SPECIFICATION forming part of Letters Patent No. 529,567, dated November 20, 1894.

Application filed July 7, 1894. Serial No. 516,826. (No model.)

*To all whom it may concern:*

Be it known that I, JAMES C. POTTER, of Pawtucket, in the State of Rhode Island, have invented certain new and useful Improvements in Feed-Regulating Devices for Machines for Opening and Preparing Cotton and other Fibrous Materials, of which the following is a specification.

My invention consists of certain improvements in feed-regulating devices for machines for opening and preparing cotton and other fibrous materials, which will first be described in connection with the accompanying drawings, and will then be specifically pointed out in the claims.

In the drawings accompanying and forming part of this specification, Figure 1 is a longitudinal section through a machine for working cotton provided with my invention. Fig. 2 is an end elevation of the feed end of the same. Fig. 3 is a side elevation of the feed end of the machine designed to show the gearing for driving the moving parts. Fig. 4 is a sectional elevation of the feeding fingers and their actuating mechanism, the line of section being on line 4—4 Fig. 3.

The particular machine represented in the drawings as equipped with my improvements is what is known as a "breaker-lapper" to which the cotton passes from an opener through the trunk X.

J are the feed rolls of the "breaker-lapper;" 1, the revolving beater; 2, the condensing cages; and 3, the laphead.

The cotton carried through the trunk is deposited on the revolving cage A, which is throughout the lower half of its periphery provided with the stationary damper A'. The deposit of cotton takes place upon the upper half of the cage the interior of which is in communication with the fan B through the dust boxes C at each side of the machine. The cotton is carried forward between the cage and the roll D, which, like the cage, is power driven, and thence drops into the chamber E below. Any cotton adhering to the cage is knocked off by the revolving clearer roll F and deposited in chamber E. The gearing by which these several rolls are driven from the counter shaft of the breaker lapper is represented plainly in Figs. 1 and 3. Surplus cotton accumulating in the chamber E and meeting the roll F will be carried over by that roll into the chamber G whence it can be removed through the door G'.

The bottom H of the chamber G forms the top wall of the horizontal feed throat, the bottom wall of which is formed by the power driven feed apron I. In order to vary the width of the throat for the purpose of varying the feed, the bottom H is made adjustable to and from the feed apron. This capacity for adjustment can be obtained in various ways. In the present instance, the bottom is held to the partition wall between the two chambers E and G by set screws or bolts $h$ which pass through vertical slots $h'$ in the partition. A hinged covering flap $g$ is provided to cover the joint between the inner end of the bottom and the adjoining wall of the chamber G. This flap adjusts itself to the varying positions of the bottom and keeps the joint tightly closed.

The feed apron forms the bottom of the chamber E, and the cotton from that chamber enters the feed throat, whence it passes to the feed rolls J of the breaker-lapper.

The feed of the cotton is effected, in conjunction with the feed apron by the feed fingers K. The fingers shown in the drawings are thin and blade-like and curved in the arc of a circle of which the axis upon which they vibrate or swing is the center; and this is their preferred construction. They are fastened to a bar L which extends across the machine and is carried by arms M fast on a rock shaft N, mounted on suitable bearings in the machine. The fingers play back and forth through a comb $a$ in the girt or outer wall of the feed chamber E, and the two extreme positions which they can assume are shown by full and dotted lines respectively in Fig. 1. In receding or drawing back they always move to the same point, but in moving forward the extent of their travel will vary automatically with the resistance of the material, so as to effect even feeding. To this end I mount loosely on the rock shaft N the bell crank or elbow lever O, the lower arm of which has a lateral projection $b$ to engage one of the finger carrying arms M in its outward movement, in this way carrying with it in said movement the fingers K which are thus positively retracted to the position shown in dotted lines in Fig. 1, at each vibration of the elbow lever O. This lever is connected to rock shaft N by a coiled spring o encircling the shaft having one of its ends held in a socket in the elbow lever O, and its opposite end inserted and held in a socket in a collar d which is rotatable upon the shaft N for the purpose of varying the tension or stress of the spring, and is secured thereon in its adjusted position by a set screw f. Under this arrangement it will be seen that when the bell crank lever swings forward, the rock shaft N and the fingers K carried by it will move in the same direction so long as the strength of the spring connection is sufficient to overcome the resistance which the cotton may offer to the advance of the feed fingers; but whenever the resistance exceeds this limit, then the feed fingers will come to a standstill while the elbow lever completes its forward stroke—the spring connection yielding sufficient to permit of this independent movement of the lever.

The lever O takes its movement from the clearer roll F by a pinion 1 on the axis of that roll which meshes with an intermediate 2 on the axis of which is a crank 3, from which a connecting rod 4 extends to the upper arm of the bell crank lever—as seen in Fig. 2.

When the fingers are retracted the cotton in the feed chamber will fall upon the feed apron, and by the return movement of the fingers this cotton will be pushed forward into the feed throat.

The cage A and rolls D and F as well as the bell crank O run continuously even though the feed apron and feed rolls I, J, may stop—the latter, as usual in this class of machines, being geared together. Upon stoppage of the apron and feed rolls the cotton by the action of the fingers will be packed more and more in front of the fingers with the effect of gradually limiting the extent of forward travel of the same, and, if the stoppage continues long enough, of finally stopping their movement altogether—the bell crank being still in vibration, which independent movement is permitted by the spring yielding connection between the bell crank and the feed fingers. As soon however as the feed apron and rolls again start the cotton will be carried forward, the congested condition of the feed throat will gradually disappear, and the fingers will then be permitted to resume their travel.

Having described my improvements and the best way now known to me of carrying the same into practical effect, what I claim, and desire to secure by Letters Patent, are the following improvements in feed regulators for machines for working cotton and other fibrous materials, viz:

1. The combination with the feed chamber, and the feed-throat leading out from said chamber and formed in part of a feed-apron, of the feed-fingers and their supporting arms, the rock-shaft to which the same are fixed, the vibratory elbow-lever mounted loosely on the rock-shaft, and provided with a projection to engage, in its rearward movement, the finger-carrying-frame or arms, a spring-yielding connection between the elbow lever and the rock shaft, and means for vibrating said elbow lever, as hereinbefore set forth.

2. The combination with the feed fingers, their supporting arms or frame and the rock-shaft, to which the same are secured, of the vibratory elbow-lever mounted loosely on the shaft, and provided with a lateral projection b extending in front of the finger-carrying frame, and the spiral spring encircling the rock shaft, having one of its ends attached to the elbow lever and its opposite end attached to a collar adjustably secured on said shaft, as shown and described.

3. The combination with the cage and the feed chamber, of the overflow chamber, or chamber for receiving surplus cotton from the feed chamber, and the clearer roll, acting at once as a stripper for the cage, and as a conveyer for the surplus cotton from the feed chamber into the overflow chamber, substantially as set forth.

In testimony whereof I affix my signature in presence of two witnesses.

JAMES C. POTTER.

Witnesses:
JAMES CUNNINGHAM,
THOMAS P. BARNEFIELD.